United States Patent
Dardin et al.

(10) Patent No.: US 8,288,327 B2
(45) Date of Patent: Oct. 16, 2012

(54) LUBRICATING OIL COMPOSITION WITH GOOD FRICTIONAL PROPERTIES

(75) Inventors: Alexander Dardin, Laudenbach (DE); Michael Mueller, Bensheim (DE); Boris Eisenberg, Darmstadt (DE)

(73) Assignee: Evonik Rohmax Additives GmbH, Darmstadt (DE)

( * ) Notice: Subject to any disclaimer, the term of this patent is extended or adjusted under 35 U.S.C. 154(b) by 1456 days.

(21) Appl. No.: 10/550,764

(22) PCT Filed: Jan. 24, 2004

(86) PCT No.: PCT/EP2004/000594
§ 371 (c)(1),
(2), (4) Date: Sep. 27, 2005

(87) PCT Pub. No.: WO2004/087850
PCT Pub. Date: Oct. 14, 2004

(65) Prior Publication Data
US 2006/0189490 A1    Aug. 24, 2006

(30) Foreign Application Priority Data
Mar. 31, 2003  (DE) .................................. 103 14 776

(51) Int. Cl.
*C10M 145/14*  (2006.01)
*C10M 145/10*  (2006.01)

(52) U.S. Cl. .......................... 508/469; 508/466; 508/470

(58) Field of Classification Search .................. 508/469, 508/466, 470
See application file for complete search history.

(56) References Cited

U.S. PATENT DOCUMENTS

| | | | |
|---|---|---|---|
| 3,816,314 A | 6/1974 | Pappas et al. | |
| 4,755,563 A | 7/1988 | West | |
| 5,834,408 A * | 11/1998 | Mishra et al. | 508/469 |
| 6,080,794 A | 6/2000 | Auschra et al. | |
| 6,348,554 B1 * | 2/2002 | Roos et al. | 526/319 |
| 6,409,778 B1 | 6/2002 | Auschra et al. | |

(Continued)

FOREIGN PATENT DOCUMENTS
CN    1382171 A    11/2002
(Continued)

OTHER PUBLICATIONS
U.S. Appl. No. 10/593,082, filed Sep. 15, 2006, Scherer, et al.
(Continued)

*Primary Examiner* — Ellen McAvoy
*Assistant Examiner* — Vishal Vasisth
(74) *Attorney, Agent, or Firm* — Oblon, Spivak, McClelland, Maier & Neustadt, L.L.P.

(57) ABSTRACT

The invention relates to a lubricating oil composition with good frictional properties, the composition having a lubricating oil and at least one additive having friction-reducing properties. The additive with friction-reducing properties is a block copolymer having hydrophobic segments P and polar segments D. The hydrophobic segments are obtained by polymerization of monomer compositions having a) between 0 and 40 wt. %, in relation to the weight of the monomer compositions for producing the hydrophobic segments, of at least one ethylenically unsaturated ester compound of formula (I), in which R represents hydrogen or methyl, $R^1$ represents a linear or branched alkyl radical having between 1 and 5 carbon atoms, and $R^2$ and $R^3$ independently represent hydrogen or a group of formula —COOR', in which R' represents hydrogen or an alkyl group having between 1 and 5 carbon atoms.

17 Claims, 5 Drawing Sheets

U.S. PATENT DOCUMENTS

| | | | |
|---|---|---|---|
| 6,458,750 | B1 | 10/2002 | Dardin et al. |
| 6,458,968 | B2 * | 10/2002 | Benicewicz et al. ............ 549/70 |
| 6,639,099 | B1 | 10/2003 | Knebel et al. |
| 2003/0060577 | A1 * | 3/2003 | Benicewicz et al. ............ 526/95 |
| 2004/0242813 | A1 * | 12/2004 | Nesvadba et al. ............ 526/135 |
| 2005/0148749 | A1 | 7/2005 | Scherer et al. |
| 2005/0239937 | A1 | 10/2005 | Scherer et al. |
| 2005/0245406 | A1 | 11/2005 | Scherer et al. |
| 2005/0261143 | A1 | 11/2005 | Scherer et al. |
| 2005/0267239 | A1 | 12/2005 | Scherer |
| 2006/0142168 | A1 | 6/2006 | Kinker et al. |
| 2006/0189490 | A1 | 8/2006 | Dardin et al. |
| 2008/0194861 | A1 | 8/2008 | Schmitt et al. |
| 2008/0255372 | A1 | 10/2008 | Schmitt et al. |
| 2008/0287629 | A1 | 11/2008 | Klesse et al. |
| 2008/0300373 | A1 | 12/2008 | Schmitt et al. |
| 2009/0001322 | A1 | 1/2009 | Wiesler et al. |
| 2009/0048406 | A1 | 2/2009 | Iroff et al. |

FOREIGN PATENT DOCUMENTS

| | | |
|---|---|---|
| EP | 0 265 254 | 4/1988 |
| EP | 0 265 254 A2 | 4/1988 |
| WO | 98/01478 | 1/1998 |
| WO | 01/40339 | 6/2001 |

OTHER PUBLICATIONS

U.S. Appl. No. 10/592,363, fied Sep. 11, 2006, Scherer, et al.
U.S. Appl. No. 11/587,988, filed Oct. 30, 2006, Fischer, et al.
U.S. Appl. No. 11/547,612, filed Oct. 4, 2006, Scherer, et al.
U.S. Appl. No. 11/572,181, filed Jan. 16, 2007, Scherer, et al.
U.S. Appl. No. 11/572,330, filed Jan. 19, 2007, Acker, et al.
U.S. Appl. No. 11/995,949, filed Jan. 17, 2008, Stoehr, et al.
U.S. Appl. No. 11/815,624, filed Aug. 6, 2007, Mueller, et al.
U.S. Appl. No. 11/909,171, filed Sep. 20, 2007, Stoehr, et al.
U.S. Appl. No. 12/306,019, filed Dec. 22, 2008, Boehmke, et al.
U.S. Appl. No. 12/279,732, filed Aug. 18, 2008, Stoehr, et al.
U.S. Appl. No. 12/668,209, filed Jan. 8, 2010, Stoehr, et al.
U.S. Appl. No. 12/672,231, filed Feb. 4, 2010, Stoehr, et al.
Korean Office Action issued Aug. 31, 2011, in Korean Patent Application No. 10-2005-7018776, filed Sep. 30, 2005 (with English-language Translation).
U.S. Appl. No. 13/213,547, filed Aug. 19, 2011, Mueller, et al.
U.S. Appl. No. 13/318,492, filed Nov. 2, 2011, Radano, et al.
U.S. Appl. No. 61/421,867, filed Dec. 10, 2010, Radano, et al.
U.S. Appl. No. 61/408,274, filed Oct. 29, 2010, Neveu, et al.
U.S. Appl. No. 61/421,870, filed Dec. 10, 2010, Radano.
U.S. Appl. No. 61/393,076, filed Oct. 14, 2010, Langston, et al.
U.S. Appl. No. 61/527,800, filed Aug. 26, 2011, McElwain, et al.
U.S. Appl. No. 61/421,876, filed Dec. 10, 2010, Radano.
Office Action issued Oct. 3, 2011, in Canadia Patent Application No. 2,519,555, filed Jan. 24, 2004 (with English-language Translation).
U.S. Appl. No. 13/202,744, filed Aug. 22, 2011, Eisenberg, et al.
U.S. Appl. No. 13/255,218, filed Sep. 7, 2011, Eisenberg, et al.

* cited by examiner

LUBRICATING OIL COMPOSITION WITH GOOD FRICTIONAL PROPERTIES

The present invention relates to lubricant oil compositions having good frictional properties, to processes for preparing these lubricant oil compositions, and to use.

The efficiency of modern gearboxes, engines or hydraulic pumps depends not only upon the properties of the machine parts but also greatly upon the frictional properties of the lubricant used. For the development of such lubricants, it is of particular importance to have knowledge of the action of the lubricant components used in relation to film formation and friction, and the selection of suitable additives can, for example, lead to lowering of the average fuel consumption of a vehicle by a few percent. In this context, particularly effective constituents of a lubricant include base oils having a particularly low viscosity and thus low inherent friction, and also organic friction modifiers. An example of this trend is the newest generation of what are known as fuel-economy engine oils of the SAE classes 5W-20, SAE 5W-30 or SAE 0W-20; which can be found analogously also for oils for manual and automatic gearboxes.

As a result of a development parallel to the fuel-saving lubricants, the use of friction-reducing additives has become even more important: the dimensions of modern gearbox and pump casings are distinctly smaller, they are cooled less, and both gearwheels and bearings have to bear higher loads. As a result, the operating temperatures are much higher than in the past. As a consequence, the tribological contact between two surfaces moving counter to one another has a reduced film thickness, and the lubricant and the additives present therein have to be capable of ensuring low frictional loss under these mixed friction conditions and of protecting the surfaces from wear. According to the current state of the art, it is assumed that typical oil-soluble friction-modifying lubricant additives either adsorb on the metal surface of a frictional contact or form reaction layers. The former consist typically of long-chain carboxylic acids and their salts, esters, ethers, alcohols, amines, amides and imides. The way in which such friction modifiers act is assumed to be alignment of the polar groups and associated film formation on the surface in frictional contact. Such a film then prevents the contact of the solid bodies when the actual oil film fails. The actual mechanism and the influence of polar interactions such as dipole-dipole interactions or hydrogen bonds has, however, not been conclusively explained.

Typical friction modifiers forming reaction layers are, for example, saturated fatty acid esters, phosphoric and triphosphoric esters, xanthogenates or sulfur-containing fatty acids. This class also includes compounds which, under the tribological stress in frictional contact, do not form solid but instead liquid reaction products having high load-bearing capacity. Examples thereof are unsaturated fatty acids, partial esters of dicarboxylic acids, dialkylphthalic esters and sulfonated olefin mixtures. The function of such friction-modifying additives is very similar to that of the EP additives, in the case of which the formation of a reaction layer in the lubricated gap wide has to proceed under relatively mild mixed friction conditions.

Furthermore, organometallic compounds such as molybdenum dithiophosphonates and dicarbamates, organic copper compounds, and also some solid lubricants such as graphite and $MoS_2$ may function as friction-modifying additives in lubricants.

A disadvantage of these compounds is their quite high cost. Furthermore, many compounds are very polar, so that they do not dissolve in fully synthetic lubricant oils.

The frictional properties of lubricants which comprise oil-soluble polymers is the subject of several patents and publications. Only in a few cases is a relationship described between the specific frictional properties and the presence of polymers or VI improvers or their structure:

JP 05271331 claims the preparation of polymers and their use in lubricants. A copolymer is described of an α-olefin and of a dibasic ester, and its reaction with alkanolamines, cycloalkanolamines, heterocyclic amines and polyalkylene polyamines. The lubricant comprising this random copolymer, compared to a reference, has a frictional coefficient reduced from 0.1104 to 0.07134, which is shown by the example of a Falex friction test (ASTM D 2714). A particular disadvantage of these polymers is their complex preparation.

JP 2000355695 (U.S. Pat. No. 6,426,323) describes lubricant compositions for continuous automatic gearboxes (CVTs) which comprise dispersing VI improvers. Preference is given to using polyalkyl methacrylates with dispersing comonomers such as dimethylaminoethyl methacrylate, 2-methyl-5-vinylpyridine and N-vinylpyrrolidone as VI improvers in order to obtain improved oxidation stability. Frictional experiments on these lubricants are described by way of example, but there is no information on the influence of the abovementioned VI improvers.

EP 570073 describes boron-containing polyalkyl acrylates and methacrylates as lubricant additives which simultaneously have the effect of a VII and of a friction modifier. In this context, cyclic boron compounds which are known to be friction-modifying components are introduced randomly as functional groups into the side chains of customary PAMA VI improvers. As relevant tests, results of SRV (vibration-friction-wear) and LFW-1 tribometer (ASTM D 2714=Falex test) friction tests in comparison to commercial PAMA VI improvers are described. A disadvantage of these copolymers is their quite complicated preparation, so that such products to date are not used commercially on a larger scale.

EP 286996 (U.S. Pat. No. 5,064,546) claims lubricant compositions of a certain naphthene-based base oil composition, which contain 0.01-5% of a friction modifier and are suitable particularly for automatic and continuous gearboxes. VI improvers, in particular PAMAs, are mentioned as additional components, but their type is judged to be uncritical in relation to the frictional performance of the formulation.

U.S. Pat. No. 4,699,723 describes dispersing multifunctional VI improvers composed of ethylene-propylene copolymers (OCPs) to which a dispersing, antioxidative functional group is grafted. An influence of these VIIs on the frictional properties of the resulting lubricants is not described. In this case, generally random copolymers are obtained which do not have friction-improving properties.

U.S. Pat. No. 6,444,622 and U.S. Pat. No. 6,303,547 describe friction-modified lubricants, in which the frictional properties are influenced by the combination of improved classical friction modifiers, in this case a $C_5$-$C_{60}$ carboxylic acid, and an amine. The addition of polyalkyl methacrylate VI improvers is also claimed only in conjunction with the adjustment of the lubricant oil viscosity (SAE units) and the shear stability. EP 0747464 describes a lubricant composition having long-lasting "anti-shudder" frictional properties for use in automatic gearboxes. The composition comprises alkoxylated fatty acid amines and also a mixture of other friction-modifying additives. Dispersing and nondispersing VI improvers are mentioned in the claims merely as further components of the lubricant without an influence on the frictional properties of the lubricant being described.

WO 00/58423 describes high-performance motor oils and other lubricants based on a mixture of a poly-alpha-olefin having high VI (HVI-PAO) and a relatively high molecular weight thickener (typically a hydrogenated poly(styrene-co-isoprene)), HSI, an ethylene-propylene copolymer (OCP) or a polyisobutylene (PIB) having a weight-average molecular weight $M_w$ of from 10 000 to 100 000 g/mol. Increased lubricant film thicknesses and good wear protection compared to the prior art are attributed to the claimed lubricants.

The authors emphasize that the use of customary high molecular weight VI improvers has considerable disadvantages owing to the non-newtonian behavior of the resulting oils. Thus, especially the thickness of the lubricant film in frictional contact is to be reduced owing to the high shear stress and the low temporary shear stability of such polymeric additives. This behavior of lubricants which comprise polymers is contradicted by the present invention.

U.S. Pat. No. 6,358,896 describes friction modifiers for motor oil compositions having improved fuel efficiency based on keto amides and keto esters. Polymeric viscosity index improvers are mentioned in the patent as components of such lubricants. Dispersing VIIs are mentioned only in relation to their action as dispersants.

WO 9524458 (U.S. Pat. No. 5,622,924) claim viscosity index improvers having a proportion of min. 70% by weight of alkyl methacrylates having not more than 10 carbon atoms. In addition to good low-temperature properties, the oils formulated with such VI improvers also possess improved low frictional properties when they are used in combination with a molybdenum-containing friction modifier.

JP 08157855 describes lubricants which comprise VI improvers which maximize the action of a molybdenum-based friction modifier. The same polymers are described in WO 9524458 are claimed.

U.S. Pat. No. 3,925,217 claims lubricants consisting of compounds which possess one or two cyclohexyl rings and ensure an improved film thickness in frictional contact of roller bearings.

N.B.: This patent is the basis of what are known as traction fluids, i.e. lubricants which, owing to their frictional properties in the hydrodynamic region (at high speeds), can transfer forces via the frictional contact. Desired here are particularly high traction and frictional coefficients in order to make the force transfer as efficient as possible.

From this are derived a series of patents which also describe polymers, polyalkyl acrylates or methacrylates or other VI improvers with cyclic structures. These include, for example:

WO 8902911/EP 339088
JP 61044997
JP 61019697

However, the contents of these patents relate to the achievement of a maximum frictional/traction coefficient under the abovementioned hydrodynamic conditions under which the frictional contact is separated completely by a lubricant film. Even though the influence of the frictional properties is important for these liquids, the effect of the oils, additives and in particular VI improvers is the opposite of that of those which are intended to have a friction-modifying action in the field of mixed friction. Thus, the traction properties of polymer solutions were investigated by Kyotani et al. who found that polymers having cyclic side chains exhibit a tendency to higher frictional/traction coefficients (Kyotani, T.; Yamada, Y.; Tezuka, T.; Yamamoto, H.; Tamai, Y.; *Sekiyu Gakkaishi* (1987), 30(5), 353-8).

In the scientific literature, statements, some of them controversial, on the influence of polymers on the frictional performance of lubricants can be found:

From his frictional experiments on lubricant oils for automatic gearboxes, Kugimiya comes to the conclusion that viscosity index improvers, both polyalkyl methacrylates and olefin copolymers, have no influence on the frictional properties of the oils (Kugimiya, T.; *Toraiborojisuto* (2000), 45(5), 387-395).

Similar results are obtained by Rodgers et al. for polyalkyl methacrylates, their N-vinylpyrrolidone copolymers and polyisobutylene in lubricant applications for automatic gearboxes (Rodgers, John J.; Gallopoulos, Nicholas E; *ASLE Trans.* (1967), 10(1), 102-12, discussion 113-14). Neither polyalkyl methacrylates nor PIB exhibit a change in the frictional characteristics (frictional curve). Only PMA-N-vinylpyrrolidone copolymers lead, if anything, to a lowering in the static frictional coefficient. However, this behavior was attributed solely to the higher viscosity of the oils investigated in the study and comprising VI improvers, and not to the structure of the polymer.

Gunsel et al. report some VI improvers which form up to 20 nm-thick films in frictional contacts and can thus shift the attainment of the limiting friction range to slower sliding and rolling speeds (Gunsel, S.; Smeeth, M.; Spikes, H.; *Society of Automotive Engineers*, (1996), SP-1209 (Subjects in Engine Oil Rheology and Tribology), 85-109). In this study, no correlation between the structure of the polymers and their influence on the actual frictional performance of the lubricant mixture is given.

In contrast, Sharma et al. find that viscosity index improvers, in particular polyalkyl methacrylates in PAO, make no significant contribution to the film thickness of the lubricant in a frictional contact (Sharma, S.-K.; Forster, N.-H.; Gschwender, L.-J.; *Tribol. Trans.* (1993), 36(4), 555-64).

From his wear experiments, Yoshida even concludes that polyalkyl methacrylates accumulate before the actual lubricant gap of a frictional contact at high loads, and lead to oil depletion and thus to high friction in the lubricant gap (Yoshida, K.; *Tribol. Trans.* (1990), 33(20), 229-37).

A problem with the known friction modifiers is thus their cost. In addition, the solubility of many known friction-modifying additives in new types of fully synthetic oils is low.

Furthermore, many of the above-described additives function merely as friction modifiers. However, it is desirable that an additive imparts further favorable properties to a base oil. This allows the overall addition of additives to be reduced, which can save further costs.

In view of the prior art, it is thus an object of the present invention to provide highly effective friction-modifying additives which can be produced particularly inexpensively. It is a further object of the present invention to provide additives which have a high stability toward oxidation and thermal stress, and also a high shear resistance. In addition, the additives should also be soluble in large amounts in very nonpolar lubricant oils, for example in fully synthetic oils. It is a further object of the present invention to provide additives which, in addition to a friction-modifying action, additionally improve the flow properties of the lubricant oil, i.e. have a viscosity index-improving action.

These and further objects which are not specified explicitly but which can be derived or discerned directly from the connections discussed by way of introduction herein are achieved by lubricant oil compositions having all features of claim 1. Appropriate modifications of the inventive lubricant oil compositions are protected in the claims dependent upon claim 1.

By virtue of a block copolymer being used as an additive having friction-modifying properties in a lubricant oil, said block copolymer including hydrophobic segments P and polar segments D, said hydrophobic segments being obtained by polymerization of monomer compositions which consists
a) from 0 to 40% by weight of one or more ethylenically unsaturated ester compounds of the formula (I)

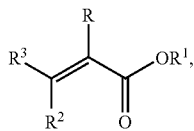

in which R is hydrogen or methyl, $R^1$ is a linear or branched alkyl radical having from 1 to 5 carbon atoms, $R^2$ and $R^3$ are each independently hydrogen or a group of the formula —COOR' in which R' is hydrogen or an alkyl group having from 1 to 5 carbon atoms,
b) from 50 to 100% by weight of one or more ethylenically unsaturated ester compounds of the formula (II)

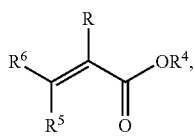

in which R is hydrogen or methyl, $R^4$ is a linear or branched alkyl radical having from 6 to 30 carbon atoms, $R^5$ and $R^6$ are each independently hydrogen or a group of the formula —COOR" in which R" is hydrogen or an alkyl group having from 6 to 30 carbon atoms,
c) from 0 to 50% by weight of comonomers,
and the polar segments being illustratable by the formula (III)

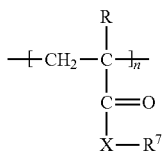

in which R is independently hydrogen or methyl, $R^7$ is independently a group comprising from 2 to 1000 carbon atoms and having at least one heteroatom, X is independently a sulfur or oxygen atom or a group of the formula $NR^8$ in which $R^8$ is independently hydrogen or a group having from 1 to 20 carbon atoms, and n is an integer greater than or equal to 3, it is possible to provide inexpensive lubricant composition which have particularly good frictional properties.

Furthermore, lubricant composition which comprise the inventive block copolymers exhibit outstanding properties as viscosity index improvers. The viscosity index-improving action is evidenced, for example, by the kinematic viscosities at 40° C. and 100° C. to ASTM D 2270.

In addition, the inventive lubricant composition have outstanding low-temperature properties. The low-temperature properties can by minirotational viscometry values (MRV) which can be obtained to ASTM D 4684, and scanning Brookfield results as arise according to ASTM D 5133. A pour point-improving action of the block copolymers to be used in lubricant oils in accordance with the invention can be determined, for example, to ASTM D 97.

If certain flow properties are to be achieved at a predefined temperature, the amount of additive can be reduced by virtue of the present invention.

At the same time, the inventive lubricant composition can achieve a series of further advantages. These include:
The inventive lubricant compositions can be prepared inexpensively.
The lubricant compositions of the present invention can have a particularly low total additive content for a predefined property profile.
The inventive lubricant compositions can include very large amounts of synthetic oils, since the block copolymers used as a friction-modifying additive in accordance with the invention are soluble even in very nonpolar oils.
The block copolymers present in the inventive lubricant compositions exhibit a high oxidation stability and are chemically very stable.

Block copolymers denote copolymers which have at least two blocks. In this context, blocks are segments of the copolymer which have a constant composition composed of one or more monomer units.

The block copolymers to be used as a friction-modifying additive in accordance with the invention include hydrophobic segments which are obtained by polymerization of monomer compositions which may in particular have (meth)acrylates, maleates and/or fumarates which may have different alcohol radicals.

The expression (meth)acrylates encompasses methacrylates and acrylates, and also mixtures of the two. These monomers are widely known. The alkyl radical may be linear, cyclic or branched.

Mixtures from which the hydrophobic segments of the block copolymers are obtainable may contain from 0 to 40% by weight, in particular from 0.5 to 20% by weight, based on the weight of the monomer compositions for the preparation of the hydrophobic segments, of one or more ethylenically unsaturated ester compounds of the formula (I)

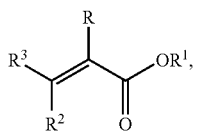

in which R is hydrogen or methyl, $R^1$ is a linear or branched alkyl radical having from 1 to 5 carbon atoms, $R^2$ and $R^3$ are each independently hydrogen or a group of the formula —COOR' in which R' is hydrogen or an alkyl group having from 1 to 5 carbon atoms.

Examples of component a) include
(meth)acrylates, fumarates and maleates which derive from saturated alcohols, such as methyl (meth)acrylate, ethyl (meth)acrylate, n-propyl (meth)acrylate, isopropyl (meth)acrylate, n-butyl (meth)acrylate, tert-butyl (meth)acrylate and pentyl (meth)acrylate;
cycloalkyl (meth)acrylates such as cyclopentyl (meth)acrylate;
(meth)acrylates which derive from unsaturated alcohols, such as 2-propynyl (meth)acrylate, allyl (meth)acrylate and vinyl (meth)acrylate.

As a further constituent, the compositions to be polymerized for the preparation of the hydrophobic segments may contain from 50 to 100% by weight, in particular from 55 to 95% by weight, based on the weight of the monomer compositions for the preparation of the hydrophobic segments, of one or more ethylenically unsaturated ester compounds of the formula (II)

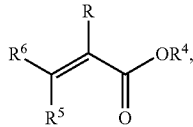
(II)

in which R is hydrogen or methyl, $R^4$ is a linear or branched alkyl radical having from 6 to 30 carbon atoms, $R^5$ and $R^6$ are each independently hydrogen or a group of the formula —COOR" in which R" is hydrogen or an alkyl group having from 6 to 30 carbon atoms.

These include
(meth)acrylates, fumarates and maleates which derive from saturated alcohols, such as hexyl (meth)acrylate, 2-ethylhexyl (meth)acrylate, heptyl (meth)acrylate, 2-tert-butylheptyl (meth)acrylate, octyl (meth)acrylate, 3-isopropylheptyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth) acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth) acrylate, eicosyl (meth)acrylate, cetyleicosyl (meth)acrylate, stearyleicosyl (meth)acrylate, docosyl (meth)acrylate and/or eicosyltetratriacontyl (meth)acrylate;
cycloalkyl (meth)acrylates such as 2,4,5-tri-t-butyl-3-vinylcyclohexyl (meth)acrylate, 2,3,4,5-tetra-t-butylcyclohexyl (meth)acrylate;
(meth)acrylates which derive from unsaturated alcohols, for example oleyl (meth)acrylate;
cycloalkyl (meth)acrylates such as 3-vinylcyclohexyl (meth) acrylate, cyclohexyl (meth)acrylate, bornyl (meth)acrylate; and also the corresponding fumarates and maleates.

The ester compounds with a long-chain alcohol radical, in particular the compounds of component (b), can be obtained, for example, by reacting (meth)acrylates, fumarates, maleates and/or the corresponding acids with long-chain fatty alcohols to form generally a mixture of esters, for example (meth)acrylates with different long-chain alcohol radicals. These fatty alcohols include Oxo Alcohol® 7911 and Oxo Alcohol® 7900, Oxo Alcohol® 1100 from Monsanto; Alphanol® 79 from ICI; Nafol® 1620, Alfol® 610 and Alfol® 810 from Condea; Epal® 610 and Epal® 810 from Ethyl Corporation; Linevol® 79, Linevol® 911 and Dobanol® 25L from Shell AG; Lial 125 from Augusta® Milan; Dehydad® and Lorol® from Henkel KGaA and also Linopol® 7-11 and Acropol® 91 Ugine Kuhlmann.

In a particular aspect of the present invention, the mixture for the preparation of the hydrophobic segments has at least 60% by weight, preferably at least 70% by weight, based on the weight of the monomer compositions for the preparation of the hydrophobic segments, of monomers of the formula (II).

Of the ethylenically unsaturated ester compounds, particular preference is given to the (meth)acrylates over the maleates and fumarates, i.e. $R^2$, $R^3$, $R^5$ and $R^6$ of the formulae (I) and (II) are, in particularly preferred embodiments, hydrogen. In general, the methacrylates are preferred over the acrylates.

In a particular aspect of the present invention, preference is given to using mixtures of long-chain alkyl (meth)acrylates according to component b), and the mixtures have at least one (meth)acrylate having from 6 to 15 carbon atoms in the alcohol radical and at least one (meth)acrylate having from 16 to 30 carbon atoms in the alcohol radical. The fraction of the (meth)acrylates having from 6 to 15 carbon atoms in the alcohol radical is preferably in the range from 20 to 95% by weight, based on the weight of the monomer composition for the preparation of the hydrophobic segments. The fraction of the (meth)acrylates having from 16 to 30 carbon atoms in the alcohol radical is preferably in the range from 0.5 to 60% by weight based on the weight of the monomer composition for the preparation of the hydrophobic segments.

Component c) of the composition to be used for the preparation of the hydrophobic segments includes in particular ethylenically unsaturated monomers which can be copolymerized with the ethylenically unsaturated ester compounds of the formulae (I) and/or (II).

However, particularly suitable comonomers for the polymerization of the present invention are those which correspond to the formula:

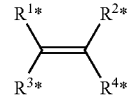

in which $R^{1*}$ and $R^{2*}$ are each independently selected from the group consisting of hydrogen, halogens, CN, linear or branched alkyl groups having from 1 to 20, preferably from 1 to 6 and more preferably from 1 to 4, carbon atoms which may be substituted by from 1 to (2n+1) halogen atoms, where n is the number of carbon atoms of the alkyl group (for example $CF_3$), α,β-unsaturated linear or branched alkenyl or alkynyl groups having from 2 to 10, preferably from 2 to 6 and more preferably from 2 to 4, carbon atoms which may be substituted by from 1 to (2n−1) halogen atoms, preferably chlorine, where n is the number of carbon atoms of the alkyl group, for example $CH_2=CCl-$, cycloalkyl groups having from 3 to 8 carbon atoms which may be substituted by from 1 to (2n−1) halogen atoms, preferably chlorine, where n is the number of carbon atoms of the cycloalkyl group; $C(=Y^*)R^{5*}$, $C(=Y^*)NR^{6*}R^{7*}$, $Y^*C(=Y^*)R^{5*}$, $SOR^{5*}$, $SO_2R^{5*}$, $OSO_2R^{5*}$, $NR^{8*}SO_2R^{5*}$, $PR^{5*}_2$, $P(=Y^*)R^{5*}_2$, $Y^*PR^{5*}_2$, $Y^*P(=Y^*)R^{5*}_2$, $NR^{8*}_2$ which may be quaternized with an additional $R^{8*}$, aryl or heterocyclyl group, where $Y^*$ may be $NR^{8*}$, S or O, preferably O; $R^{5*}$ is an alkyl group having from 1 to 20 carbon atoms, an alkylthio having from 1 to 20 carbon atoms, $OR^{15}$ ($R^{15}$ is hydrogen or an alkali metal), alkoxy of from 1 to 20 carbon atoms, aryloxy or heterocyclyloxy; $R^{6*}$ and $R^{7*}$ are each independently hydrogen or an alkyl group having from 1 to 20 carbon atoms, or $R^{6*}$ and $R^{7*}$ together may form an alkylene group having from 2 to 7, preferably from 2 to 5, carbon atoms, and they form a 3- to 8-membered, preferably 3- to 6-membered, ring, and $R^{8*}$ is hydrogen, linear or branched alkyl or aryl groups having from 1 to 20 carbon atoms; $R^{3*}$ and $R^{4*}$ are independently selected from the group consisting of hydrogen, halogen (preferably fluorine or chlorine), alkyl groups having 1 to 6 carbon atoms and $COOR^{9*}$ in which $R^{9*}$ is hydrogen, an alkali metal or an alkyl group having from 1 to 40 carbon atoms, or $R^{1*}$ and $R^{3*}$ together may form a group of the formula $(CH_2)_{n'}$ which may be substituted by from 1 to 2n' halogen atoms or $C_1$ to $C_4$ alkyl groups, or form the formula $C(=O)$—$Y^*$—$C(=O)$ where n' is from 2 to 6, preferably 3 or 4 and $Y^*$ is as defined above; and where at least 2 of the $R^{1*}$, $R^{2*}$, $R^{3*}$ and $R^{4*}$ radicals are hydrogen or halogen.

These include:

aryl (meth)acrylates such as benzyl methacrylate or phenyl methacrylate in which the aryl radicals may each be unsubstituted or up to tetrasubstituted;

methacrylates of halogenated alcohols, such as 2,3-dibromopropyl methacrylate, 4-bromophenyl methacrylate, 1,3-dichloro-2-propyl methacrylate, 2-bromoethyl methacrylate, 2-iodoethyl methacrylate, chloromethyl methacrylate;

vinyl halides, for example vinyl chloride, vinyl fluoride, vinylidene chloride and vinylidene fluoride;

vinyl esters such as vinyl acetate;

styrene, substituted styrenes having an alkyl substituent in the side chain, for example α-methyl-styrene and α-ethylstyrene, substituted styrenes having an alkyl substituent on the ring, such as vinyltoluene and p-methylstyrene, halogenated styrenes, for example monochlorostyrenes, dichlorostyrenes, tribromostyrenes and tetrabromostyrenes;

heterocyclic vinyl compounds such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles; vinyl and isoprenyl ethers; maleic acid and maleic acid derivatives, for example mono- and diesters of maleic acid, maleic anhydride, methyl maleic anhydride, maleinimide, methylmaleinimide; fumaric acid and fumaric acid derivatives, for example mono- and diesters of fumaric acid;

dienes, for example divinylbenzene.

Very particularly preferred mixtures for the preparation of the hydrophobic segments have methyl methacrylate, butyl methacrylate, lauryl methacrylate, stearyl methacrylate and/or styrene.

These components may be used individually or as mixtures.

Additionally, the block copolymers present in accordance with the invention as friction-modifying additives in the lubricant composition include polar segments D which can be illustrated by the formula (III)

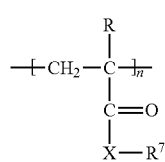

(III)

in which R is independently hydrogen or methyl, $R^7$ is independently a group which comprises from 2 to 1000 carbon atoms and has at least one heteroatom, X is independently a sulfur or oxygen atom or a group of the formula $NR^8$ in which $R^8$ is independently hydrogen or a group having from 1 to 20 carbon atoms, and n is an integer greater than or equal to 3.

The different groups X, R and $R^7$, based on the different repeat units within one polar segment D, may be the same or different.

The $R^7$ radical is a group comprising from 2 to 1000, in particular from 2 to 100, preferably from 2 to 20 carbon atoms. The term "group having from 2 to 1000 carbon" denotes radicals of organic compounds having from 2 to 1000 carbon atoms. It encompasses aromatic and heteroaromatic groups, and also alkyl, cycloalkyl, alkoxy, cycloalkoxy, alkenyl, alkanoyl, alkoxycarbonyl groups, and also heteroaliphatic groups. The groups mentioned may be branched or unbranched. In addition, these groups may have customary substituents.

Substituents are, for example, linear and branched alkyl groups having from 1 to 6 carbon atoms, for example methyl, ethyl, propyl, butyl, pentyl, 2-methylbutyl or hexyl; cycloalkyl groups, for example cyclopentyl and cyclohexyl; aromatic groups such as phenyl or naphthyl; amino groups, ether groups, ester groups and halides.

According to the invention, aromatic groups denote radicals of mono- or polycyclic aromatic compounds having preferably from 6 to 20, in particular from 6 to 12, carbon atoms. Heteroaromatic groups denote aryl radicals in which at least one CH group has been replaced by N and/or at least two adjacent CH groups have been replaced by S, NH or O, heteroaromatic groups having from 3 to 19 carbon atoms.

Aromatic or heteroaromatic groups preferred in accordance with the invention derive from benzene, naphthalene, biphenyl, diphenyl ether, diphenylmethane, diphenyldimethylmethane, bisphenone, diphenylsulfone, thiophene, furan, pyrrole, thiazole, oxazole, imidazole, isothiazole, isoxazole, pyrazole, 1,3,4-oxadiazole, 2,5-diphenyl-1,3,4-oxadiazole, 1,3,4-thiadiazole, 1,3,4-triazole, 2,5-diphenyl-1,3,4-triazole, 1,2,5-triphenyl-1,3,4-triazole, 1,2,4-oxadiazole, 1,2,4-thiadiazole, 1,2,4-triazole, 1,2,3-triazole, 1,2,3,4-tetrazole, benzo[b]thiophene, benzo[b]furan, indole, benzo[c]thiophene, benzo[c]furan, isoindole, benzoxazole, benzothiazole, benzimidazole, benzisoxazole, benzisothiazole, benzopyrazole, benzothiadiazole, benzotriazole, dibenzofuran, dibenzothiophene, carbazole, pyridine, bipyridine, pyrazine, pyrazole, pyrimidine, pyridazine, 1,3,5-triazine, 1,2,4-triazine, 1,2,4,5-triazine, tetrazine, quinoline, isoquinoline, quinoxaline, quinazoline, cinnoline, 1,8-naphthyridine, 1,5-naphthyridine, 1,6-naphthyridine, 1,7-naphthyridine, phthalazine, pyridopyrimidine, purine, pteridine or quinolizine, 4H-quinolizine, diphenyl ether, anthracene, benzopyrrole, benzooxathiadiazole, benzooxadiazole, benzopyridine, benzopyrazine, benzopyrazidine, benzopyrimidine, benzotriazine, indolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, each of which may also be substituted.

The preferred alkyl groups include the methyl, ethyl, propyl, isopropyl, 1-butyl, 2-butyl, 2-methylpropyl, tert-butyl radical, pentyl, 2-methylbutyl, 1,1-dimethylpropyl, hexyl, heptyl, octyl, 1,1,3,3-tetra-methylbutyl, nonyl, 1-decyl, 2-decyl, undecyl, dodecyl, pentadecyl and the eicosyl group.

The preferred cycloalkyl groups include the cyclopropyl, cyclobutyl, cyclopentyl, cyclohexyl, cycloheptyl and the cyclooctyl group, each of which is optionally substituted with branched or unbranched alkyl groups.

The preferred alkenyl groups include the vinyl, allyl, 2-methyl-2-propenyl, 2-butenyl, 2-pentenyl, 2-decenyl and the 2-eicosenyl group.

The preferred alkynyl groups include the ethynyl, propargyl, 2-methyl-2-propynyl, 2-butynyl, 2-pentynyl and the 2-decynyl group.

The preferred alkanoyl groups include the formyl, acetyl, propionyl, 2-methylpropionyl, butyryl, valeroyl, pivaloyl, hexanoyl, decanoyl and the dodecanoyl group.

The preferred alkoxycarbonyl groups include the methoxycarbonyl, ethoxycarbonyl, propoxycarbonyl, butoxycarbonyl, tert-butoxycarbonyl, hexyloxycarbonyl, 2-methylhexyloxycarbonyl, decyloxycarbonyl or dodecyloxycarbonyl group.

The preferred alkoxy groups include alkoxy groups whose hydrocarbon radical is one of the aforementioned preferred alkyl groups.

The preferred cycloalkoxy groups include cycloalkoxy groups whose hydrocarbon radical is one of the aforementioned preferred cycloalkyl groups.

The preferred heteroatoms which are present in the $R^7$ radical include oxygen, nitrogen, sulfur, boron, silicon and phosphorus.

In a particular embodiment of the present invention, the $R^7$ radical in formula (III) has at least one group of the formula —OH or —$NR^8R^8$ in which $R^8$ independently includes hydrogen or a group having from 1 to 20 carbon atoms.

The X group in formula (III) can preferably be illustrated by the formula NH.

The numerical ratio of heteroatoms to carbon atoms in the $R^7$ radical of the formula (III) may lie within wide ranges. This ratio is preferably in the range from 1:1 to 1:10, in particular from 1:1 to 1:5 and more preferably from 1:2 to 1:4.

The $R^7$ radical of the formula (III) comprises from 2 to 1000 carbon atoms. In a particular aspect, the $R^7$ radical has at most 10 carbon atoms.

The polar segments D can be prepared in particular by polymerization of corresponding (meth)acrylates.

These include hydroxyalkyl (meth)acrylates such as 3-hydroxypropyl methacrylate, 3,4-dihydroxybutyl methacrylate, 2-hydroxyethyl methacrylate, 2-hydroxypropyl methacrylate, 2,5-dimethyl-1,6-hexanediol (meth)acrylate, 1,10-decanediol (meth)acrylate, carbonyl-containing methacrylates such as 2-carboxyethyl methacrylate, carboxymethyl methacrylate, oxazolidinylethyl methacrylate, N-(methacryloyloxy)formamide, acetonyl methacrylate, N-methacryloylmorpholine, N-methacryloyl-2-pyrrolidinone, N-(2-methacryloyloxyethyl)-2-pyrrolidinone, N-(3-methacryloyloxypropyl)-2-pyrrolidinone, N-(2-methacryloyloxypentadecyl)-2-pyrrolidinone, N-(3-methacryloyloxyheptadecyl)-2-pyrrolidinone;
glycol dimethacrylates such as 1,4-butanediol methacrylate, 2-butoxyethyl methacrylate, 2-ethoxyethoxymethyl methacrylate, 2-ethoxyethyl methacrylate;
methacrylates of ether alcohols, such as tetrahydrofurfuryl methacrylate, vinyloxyethoxyethyl methacrylate, methoxyethoxyethyl methacrylate, 1-butoxypropyl methacrylate, 1-methyl-(2-vinyloxy)ethyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethoxymethyl methacrylate, 2-ethoxyethyl methacrylate, allyloxymethyl methacrylate, 1-ethoxybutyl methacrylate, methoxymethyl methacrylate, 1-ethoxyethyl methacrylate, ethoxymethyl methacrylate and ethoxylated (meth)acrylates which have preferably from 1 to 20, in particular from 2 to 8, ethoxy groups;
aminoalkyl (meth)acrylates and aminoalkyl (meth)acrylatamides, such as N-(3-dimethylaminopropyl)methacrylamide, dimethylaminopropyl methacrylate, 2-dimethylaminoethyl methacrylate, 3-diethylaminopentyl methacrylate, 3-dibutylaminohexadecyl (meth)acrylate;
nitriles of (meth)acrylic acid and other nitrogen-containing methacrylates, such as N-(methacryloyloxyethyl)diisobutyl ketimine, N-(methacryloyloxyethyl)dihexadecyl ketimine, methacryloylamidoacetonitrile, 2-methacryloyloxyethylmethylcyanamide, cyanomethyl methacrylate;
heterocyclic (meth)acrylates such as 2-(1-imidazolyl)ethyl (meth)acrylate, 2-(4-morpholinyl)ethyl (meth)acrylate and 1-(2-methacryloyloxyethyl)-2-pyrrolidone; oxiranyl methacrylates such as 2,3-epoxybutyl methacrylate, 3,4-epoxybutyl methacrylate, 10,11-epoxyundecyl methacrylate, 2,3-epoxycyclohexyl methacrylate, 10,11-epoxyhexadecyl methacrylate; glycidyl methacrylate;
sulfur-containing methacrylates such as ethylsulfinylethyl methacrylate, 4-thiocyanatobutyl methacrylate, ethylsulfonylethyl methacrylate, thiocyanatomethyl methacrylate, methylsulfinylmethyl methacrylate, bis(methacryloyloxyethyl)sulfide;
phosphorus-, boron- and/or silicon-containing methacrylates such as 2-(dimethylphosphato)propyl methacrylate, 2-(ethylenephosphito)propyl methacrylate, dimethylphosphinomethyl methacrylate, dimethylphosphonoethyl methacrylate, diethylmethacryloyl phosphonate, dipropylmethacryloyl phosphate, 2-(dibutylphosphono)-ethyl methacrylate, 2,3-butylenemethacryloylethyl borate, methyldiethoxymethacryloylethoxysilane, diethylphosphatoethyl methacrylate.

These monomers may be used individually or as a mixture.

The ethoxylated (meth)acrylates which can be used to prepare the polar segments D can be obtained, for example, by transesterification of alkyl (meth)acrylates with ethoxylated alcohols which more preferably have from 1 to 20, in particular from 2 to 8, ethoxy groups. The hydrophobic radical of the ethoxylated alcohols may preferably comprise from 1 to 40, in particular from 4 to 22, carbon atoms, and either linear or branched alcohol radicals may be used. In a further preferred embodiment, the ethoxylated (meth)acrylates have an OH end group.

Examples of commercially available ethoxylates which can be employed for the preparation of ethoxylated (meth)acrylates are ethers of the Lutensol® A brands, in particular Lutensol® A 3 N, Lutensol® A 4 N, Lutensol® A 7 N and Lutensol® A 8 N, ethers of the Lutensol® TO brands, in particular Lutensol® TO 2, Lutensol® TO 3, Lutensol® TO 5, Lutensol® TO 6, Lutensol® TO 65, Lutensol® TO 69, Lutensol® TO 7, Lutensol® TO 79, Lutensol® 8 and Lutensol® 89, ethers of the Lutensol® AO brands, in particular Lutensol® AO 3, Lutensol® AO 4, Lutensol® AO 5, Lutensol® AO 6, Lutensol® AO 7, Lutensol® AO 79, Lutensol® AO 8 and Lutensol® AO 89, ethers of the Lutensol® ON brands, in particular Lutensol® ON 30, Lutensol® ON 50, Lutensol® ON 60, Lutensol® ON 65, Lutensol® ON 66, Lutensol® ON 70, Lutensol® ON 79 and Lutensol® ON 80, ethers of the Lutensol® XL brands, in particular Lutensol® XL 300, Lutensol® XL 400, Lutensol® XL 500, Lutensol® XL 600, Lutensol® XL 700, Lutensol® XL 800, Lutensol® XL 900 and Lutensol® XL 1000, ethers of the Lutensol® AP brands, in particular Lutensol® AP 6, Lutensol® AP 7, Lutensol® AP 8, Lutensol® AP 9, Lutensol® AP 10, Lutensol® AP 14 and Lutensol® AP 20, ethers of the IMBENTIN® O brands, in particular of the IMBENTIN® AG brands, of the IMBENTIN® U brands, of the IMBENTIN® C brands, of the IMBENTIN® T brands, of the IMBENTIN® OA brands, of the IMBENTIN® POA brands, of the IMBENTIN® N brands and of the IMBENTIN® O brands and ethers of the Marlipal® brands, in particular Marlipal® 1/7, Marlipal®

1012/6, Marlipal® 1618/1, Marlipal® 24/20, Marlipal® 24/30, Marlipal® 24/40, Marlipal® O13/20, Marlipal® O13/30, Marlipal® O13/40, Marlipal® O25/30, Marlipal® O25/70, Marlipal® O45/30, Marlipal® O45/40, Marlipal® O45/50, Marlipal® O45/70 and Marlipal® O45/80.

Of these, particular preference is given to aminoalkyl (meth)acrylates and aminoalkyl (meth)acrylamides, for example N-(3-dimethylaminopropyl)methacrylamide (DMAPMAM), and hydroxyalkyl (meth)acrylates, for example 2-hydroxyethyl methacrylate (HEMA).

In addition to diblock copolymers, the present invention also provides multiblock copolymers which have at least three, preferably at least four, blocks. These block copolymers may have alternating blocks. In addition, the block copolymers may also be present as comb polymers or as star polymers.

Accordingly, preferred block copolymers having hydrophobic segments P and polar segments D may be represented by the formula

in which m and n are each independently integers in the range from 1 to 40, in particular from 1 to 5 and preferably 1 or 2, without any intention that this should impose a restriction. When m=1 and n=5, this may, for example, result in a comb or a star polymer. When m=2 and n=2, this may result, for example, in a star polymer or a block copolymer having alternating P-D-P-D blocks.

The length of the hydrophobic and polar segments may vary within wide ranges. The hydrophobic segments P preferably have a weight-average degree of polymerization of at least 10, in particular at least 50. The weight-average degree of polymerization of the hydrophobic segments is preferably in the range from 20 to 5000, in particular from 60 to 2000.

The length of the polar segments D is at least 3, preferably at least 5 and more preferably at least 10, monomer units, this number being represented by the index n in formula (III).

The polar segments D preferably have a weight-average degree of polymerization in the range from 10 to 1000.

In a particular aspect, weight ratio of the polar segments D to the hydrophobic segments P is in the range from 1:1 to 1:100, preferably from 1:2 to 1:30.

In a preferred embodiment of the present invention, the lengths of the hydrophobic segments to the polar segments of the copolymer have a ratio in the range from 10:1 to 1:10, preferably from 5:1 to 1:2 and more preferably from 3:1 to 1:1, although the present invention is also intended to encompass other length ratios of the blocks relative to one another.

Those skilled in the art are aware of the polydispersity of the block copolymers and of the particular segments. The values reported relate to the particular weight-average molecular weight.

The friction-modifying block copolymers may be obtained, for example, by changing the composition of the monomer mixture to be polymerized during the polymerization. This can be effected continuously or discontinuously, in each case to prepare hydrophobic or polar segments.

To this end, different monomers or mixtures of monomers may be added batchwise to the reaction mixture. In this context, the living character of ATRP processes should be taken into account, so that the reaction can be interrupted over a prolonged period between the addition of the different monomers or mixtures of monomers. A similar result can also be achieved by, in the case of a continuous addition of monomers, abruptly changing their compositions at certain times.

The aforementioned monomers may be polymerized by means of initiators which have a transferable atom group. In general, these initiators can be described by the formula Y—(X)$_m$ in which Y represents the core molecule which is assumed to form radicals, X represents a transferable atom or a transferable atom group, and m is an integer in the range from 1 to 10, depending on the functionality of the group Y. If m>1, the different transferable atom groups X may have a different definition. When the functionality of the initiator is >2, star-like polymers are obtained. Preferred transferable atoms or atom groups are halogens, for example Cl, Br and/or I.

As mentioned above, it is assumed of the group Y that it forms radicals which serve as an initiator molecule, this radical adding onto the ethylenically unsaturated monomers. The group Y therefore preferably has substituents which can stabilize radicals. These substituents include —CN, —COR and —CO$_2$R, where R is in each case an alkyl or aryl radical, aryl and/or heteroaryl groups.

Alkyl radicals are saturated or unsaturated, linear or branched hydrocarbon radicals having from 1 to 40 carbon atoms, for example methyl, ethyl, propyl, butyl, pentyl, 2-methylbutyl, pentenyl, cyclohexyl, heptyl, 2-methylheptenyl, 3-methylheptyl, octyl, nonyl, 3-ethylnonyl, decyl, undecyl, 4-propenylundecyl, dodecyl, tridecyl, tetradecyl, pentadecyl, hexadecyl, heptadecyl, octadecyl, nonadecyl, eicosyl, cetyleicosyl, docosyl and/or eicosyltetratriacontyl.

Aryl radicals are cyclic aromatic radicals which have from 6 to 14 carbon atoms in the aromatic ring. These radicals may be substituted. Substituents are, for example, linear and branched alkyl groups having from 1 to 6 carbon atoms, for example methyl, ethyl, propyl, butyl, pentyl, 2-methylbutyl or hexyl; cycloalkyl groups, for example cyclopentyl and cyclohexyl; aromatic groups such as phenyl or naphthyl; amino groups, ether groups, ester groups and halides.

The aromatic radicals include, for example, phenyl, xylyl, toluyl, naphthyl or biphenyl.

The term "heteroaryl" denotes a heteroaromatic ring system in which at least one CH group has been replaced by N, or two adjacent CH groups by S, O or NH, such as a radical of thiophene, furan, pyrrole, thiazole, oxazole, pyridine, pyrimidine and benzo[a]furan, each of which may likewise have the aforementioned substituents.

An initiator which can be used in accordance with the invention may be any compound which has one or more atoms or atom groups which can be transferred by a free-radical mechanism under the polymerization conditions.

Suitable initiators include those of the formulae:

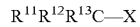

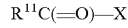

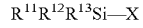

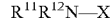

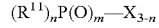

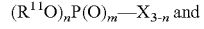

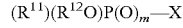

in which X is selected from the group consisting of Cl, Br, I, OR$^{10}$ [where R$^{10}$ is an alkyl group of from 1 to 20 carbon atoms, in which each hydrogen atom may independently be replaced by a halide, preferably fluoride or chloride, alkenyl of from 2 to 20 carbon atoms, preferably vinyl, alkynyl of from 2 to 10 carbon atoms, preferably acetylenyl, phenyl which may be substituted by from 1 to 5 halogen atoms or alkyl groups having from 1 to 4 carbon atoms, or aralkyl (aryl-substituted alkyl in which the aryl group is phenyl or substituted phenyl and the alkyl group is an alkyl having from 1 to 6 carbon atoms, for example benzyl)]; $SR^{14}$, $SeR^{14}$, $OC(=O)R^{14}$, $OP(=O)R^{14}$, $OP(=O)(OR^{14})_2$, $OP(=O)OR^{14}$, $O-N(R^{14})_2$, $S-C(=S)N(R^{14})_2$, CN, NC, SCN, CNS, OCN, CNO and $N_3$, where $R^{14}$ is an aryl group or a linear or branched alkyl group having from 1 to 20, preferably from 1 to 10, carbon atoms, where two $R^{14}$ groups, if present, together may form a 5-, 6- or 7-membered heterocyclic ring; and $R^{11}$, $R^{12}$ and $R^{13}$ are each independently selected from the group consisting of hydrogen, halogens, alkyl groups having from 1 to 20, preferably from 1 to 10 and more preferably from 1 to 6, carbon atoms, cycloalkyl groups having from 3 to 8 carbon atoms, $R^{8*}_3Si$, $C(=Y^*)R^{5*}$, $C(=Y^*)NR^{6*}R^{7*}$, where $Y^*$, $R^{5*}$, $R^{6*}$ and $R^{7*}$ are each as defined above, COCl, OH (one of the $R^{11}$, $R^{12}$ and $R^{13}$ radicals is preferably OH), CN, alkenyl or alkynyl groups having 2 to 20 carbon atoms, preferably from 2 to 6 carbon atoms, and more preferably allyl or vinyl, oxiranyl, glycidyl, alkylene or alkenylene groups having from 2 to 6 carbon atoms which are substituted by oxiranyl or glycidyl, aryl, heterocyclyl, aralkyl, aralkenyl (aryl-substituted alkenyl in which aryl is as defined above and alkenyl is vinyl which is substituted by one or two $C_1$ to $C_6$ alkyl groups and/or halogen atoms, preferably by chlorine), alkyl groups having from 1 to 6 carbon atoms in which from one to all of the hydrogen atoms, preferably one of them, is/are substituted by halogen (preferably fluorine or chlorine when one or more hydrogen atoms are replaced, and preferably fluorine, chlorine or bromine if one hydrogen atom is replaced), alkyl groups having 1 to 6 carbon atoms which are substituted by from 1 to 3 substituents (preferably 1) selected from the group consisting of $C_1$-$C_4$ alkoxy, aryl, heterocyclyl, $C(=Y^*)R^{5*}$ (where $R^{5*}$ is as defined above), $C(=Y^*)NR^{6*}R^{7*}$ (where $R^{6*}$ and $R^{7*}$ are each as defined above), oxiranyl and glycidyl; (preferably not more than 2 of the $R^{11}$, $R^{12}$ and $R^{13}$ radicals are hydrogen; more preferably, not more than one of the $R^{11}$, $R^{12}$ and $R^{13}$ radicals is hydrogen); m=0 or 1; and m=0, 1, or 2.

The particularly preferred initiators include benzyl halides such as p-chloromethylstyrene, α-dichloroxylene, α,α-dichloroxylene, α,α-dibromoxylene and hexakis(α-bromomethyl)benzene, benzyl chloride, benzyl bromide, 1-bromo-1-phenylethane and 1-chloro-1-phenylethane; carboxylic acid derivatives which are halogenated at the α-position, for example propyl 2-bromopropionate, methyl 2-chloropropionate, ethyl 2-chloropropionate, methyl 2-bromopropionate, ethyl 2-bromoisobutyrate; tosyl halides such as p-toluenesulfonyl chloride; alkyl halides such as tetrachloromethane, tribromo(meth)ane, 1-vinylethyl chloride, 1-vinylethyl bromide; and halogen derivatives of phosphoric esters, such as dimethylphosphoryl chloride.

The initiator is used generally in a concentration in the range from $10^{-4}$ mol/l to 3 mol/l, preferably in the range from $10^{-3}$ mol/l to $10^{-1}$ mol/l, and more preferably in the range from $5*10^{-2}$ mol/l to $5*10^{-1}$ mol/l, without any intention that this should impose a restriction. If all of the monomer is converted, the molecular weight of the polymer is calculated from the ratio of initiator to monomer. This ratio is preferably in the range from $10^{-4}$:1 to 0.5:1, more preferably in the range from $5*10^{-3}$:1 to $5*10^{-2}$:1.

To carry out the polymerization, catalysts are used which comprise at least one transition metal. In this context, any transition metal compound may be used which can form a redox cycle with the initiator or the polymer chain which has a transferable atom group. In these cycles, the transferable atom group and the catalyst reversibly form a bond, and the oxidation state of the transition metal is increased or lowered. It is assumed that free radicals are at the same time released or scavenged, so that the free-radical concentration remains very low. However, it is also possible that the addition of the transition metal compound to the transferable atom group enables or eases the insertion of ethylenically unsaturated monomers into the Y—X or Y(M)$_n$-X bond, where Y and X are each as defined above and M denotes the monomers, while z represents the degree of polymerization.

Preferred transition metals in this context are Cu, Fe, Cr, Co, Ne, Sm, Mn, Mo, Ag, Zn, Pd, Pt, Re, Rh, Ir, In, Yd and/or Ru, each of which is used in suitable oxidation states. These metals may be used individually and as a mixture. It is assumed that these metals catalyze the redox cycles of the polymerization, the $Cu^+/Cu^{2+}$ or $Fe^{2+}/Fe^{3+}$ redox pair, for example, being effective. Accordingly, the metal compounds are added to the reaction mixture in the form of halides, for example chloride or bromide, in the form of alkoxide, hydroxide, oxide, sulfate, phosphate or hexafluorophosphate, trifluoromethanesulfate. The preferred metallic compounds include $Cu_2O$, CuBr, CuCl, CuI, $CuN_3$, CuSCN, CuCN, $CuNO_2$, $CuNO_3$, $CuBF_4$, Cu($CH_3COO$), Cu($CF_3COO$), $FeBr_2$, $RuBr_2$, $CrCl_2$ and $NiBr_2$.

It is also possible to use compounds in higher oxidation states, for example $CuBr_2$, $CuCl_2$, CuO, $CrCl_3$, $Fe_2O_3$ and $FeBr_3$. In these cases, the reaction can be initiated with the aid of classical free-radical formers, for example AIBN. In this case, the transition metal compounds are initially reduced, since they are reacted with the free radicals obtained from the classical free-radical formers. This is reverse ATRP, as has been described by Wang and Matyjaszewski in Macromolecules (1995), Vol. 28, p. 7572-7573.

In addition, the transition metals may be used for catalysis as the metal in the zero oxidation state, in particular in a mixture with the aforementioned compounds, as illustrated, for example, in WO 98/40415. In these cases, the reaction rate of the reaction can be increased. It is assumed that this increases the concentration of catalytically active transition metal compound by comproportionation of transition metals in a high oxidation state with metallic transition metal.

The molar ratio of transition metal to initiator is generally in the range from 0.0001:1 to 10:1, preferably in the range from 0.001:1 to 5:1 and more preferably in the range from 0.01:1 to 2:1, without any intention that this should impose a restriction.

The polymerization takes place in the presence of ligands which can form a coordination compound with the metallic catalyst(s). Among other functions, these ligands serve to increase the solubility of the transition metal compound. A further important function of the ligands is to prevent the formation of stable organometallic compounds. This is particularly important since these stable compounds would not polymerize under the selected reaction conditions. In addition, it is assumed that the ligands ease the abstraction of the transferable atom group.

These ligands are known per se and described, for example, in WO 97/18247, WO 98/40415. These compounds generally have one or more nitrogen, oxygen, phosphorus and/or sulfur atoms via which the metal atom can be bonded. Many of these ligands can be illustrated in general by the formula $R^{16}$—Z—($R^{18}$—Z)$_m$—$R^{17}$ in which $R^{16}$ and $R^{17}$ are each independently H, $C_1$ to $C_{20}$ alkyl, aryl, heterocyclyl, each of which may optionally be substituted. These substituents include alkoxy radicals and the alkylamino radicals. $R^{16}$ and $R^{17}$ may optionally form a saturated, unsaturated or heterocyclic ring.

Z is O, S, NH, NR$^{19}$ or PR$^{19}$, where R$^{19}$ is as defined for R$^{16}$. R$^{18}$ is independently a divalent group having from 1 to 40 carbon atoms, preferably from 2 to 4 carbon atoms, which may be linear, branched or cyclic, for example a methylene, ethylene, propylene or butylene group. The definition of alkyl and aryl was given above. Heterocyclyl radicals are cyclic radicals having from 4 to 12 carbon atoms in which one or more of the CH$_2$ groups of the ring have been replaced by heteroatom groups such as O, S, NH and/or NR, where the R radical is as defined for R$^{16}$.

A further group of suitable ligands can be illustrated by the formula

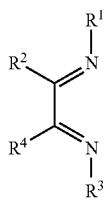

(VI)

in which R$^1$, R$^2$, R$^3$ and R$^4$ are each independently H, C$_1$ to C$_{20}$ alkyl, aryl, heterocyclyl and/or heteroaryl radical, where the R$^1$ and R$^2$ or R$^3$ and R$^4$ radicals together may form a saturated or unsaturated ring.

Preferred ligands in this context are chelate ligands which contain nitrogen atoms.

The preferred ligands include triphenylphosphine, 2,2-bipyridine, alkyl-2,2-bipyridine such as 4,4-di-(5-nonyl)-2,2-bipyridine, 4,4-di(5-heptyl)-2,2-bipyridine, tris(2-aminoethyl)amine (TREN), N,N,N',N',N"-pentamethyldiethylenetriamine, 1,1,4,7,10,10-hexamethyltriethylenetetramine and/or tetramethylethylenediamine. Further preferred ligands are described, for example, in WO 97/47661. The ligands may be used individually or as a mixture.

These ligands may form coordination compounds in situ with the metal compounds, or they can first be formed as coordination compounds and then added to the reaction mixture.

The ratio of ligand to transition metal is dependent upon the denticity of the ligand and of the coordination number of the transition metal. In general, the molar ratio is in the range from 100:1 to 0.1:1, preferably from 6:1 to 0.1:1 and more preferably from 3:1 to 0.5:1, without the intention that this should impose a restriction.

The monomers, the transition metal catalysts, the ligands and the initiators are selected depending on the desired polymer solution. It is assumed that a high rate constant of the reaction between the transition metal-ligand complex and the transferable atom group is essential for a narrow molecular weight distribution. When the rate constant of this reaction is too low, the concentration of free radicals becomes too high, so that typical termination reactions occur, which are responsible for a broad molecular weight distribution. The exchange rate is dependent, for example, upon the transferable atom group, the transition metal, the ligands and the anion of the transition metal compound. Valuable information on the selection of these components can be found by those skilled in the art, for example, in WO 98/40415.

In addition to the above-illustrated ATRP process, the inventive block copolymers can also be obtained, for example, via raft methods ("Reversible Addition Fragmentation Chain Transfer"). This process is illustrated in detail, for example, in WO 98/01478, which is incorporated by reference for the purposes of the disclosure.

In this process, the monomer compositions are carried out in the presence of chain transfer reagents, so that a "living" free-radical polymerization proceeds. In this process, dithiocarboxylic esters in particular are used, although polymeric dithiocarboxylic esters are also known.

The preferred chain transfer reagents include in particular dithiocarboxylic esters of the formula

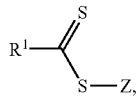

(VII)

in which the R$^1$ radical is hydrogen, halogen or a group having from 1 to 20 carbon atoms, and the Z radical is a group having from 1 to 20 carbon atoms. The R$^1$ and/or Z radicals preferably have a free radical-stabilizing group. The term free radical-stabilizing group was explained in relation to the ATRP process.

The preferred dithiocarboxylic esters include cumyl dithioformate (2-phenylprop-2-yl dithioformate), cumyl dithiobenzoate (2-phenylprop-2-yl dithiobenzoate), benzyl dithiobenzoate and benzyl dithioacetate.

The RAFT polymerization is initiated generally with classical free-radical formers. These include the azo initiators which are well known within the technical field, such as AIBN and 1,1-azobiscyclohexanecarbonitrile, and also peroxy compounds such as methyl ethyl ketone peroxide, acetylacetone peroxide, dilauryl peroxide, tert-butyl per-2-ethylhexanoate, ketone peroxide, tert-butyl peroctoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydro-peroxide, tert-butyl hydroperoxide, bis(4-tert-butyl-cyclohexyl) peroxydicarbonate, mixtures of two or more of the aforementioned compounds with one another, and also mixtures of the aforementioned compounds with compounds which have not been mentioned and can likewise form free radicals.

The polymerization may be carried out at standard pressure, reduced pressure or elevated pressure. The polymerization temperature too is uncritical. However, it is generally in the range of −20°-200° C., preferably 0°-130° C. and more preferably 60°-120° C.

The polymerization may be carried out with or without solvent. The term solvent is to be understood here in a broad sense.

The polymerization is preferably carried out in a nonpolar solvent. These include hydrocarbon solvents, for example aromatic solvents such as toluene, benzene and xylene, saturated hydrocarbons, for example cyclohexane, heptane, octane, nonane, decane, dodecane, which may also be present in branched form. These solvents may be used individually and as a mixture. Particularly preferred solvents are mineral oils and synthetic oils, and also mixtures thereof. Of these, very particular preference is given to mineral oils.

Mineral oils are known per se and commercially available. They are generally obtained from mineral oil or crude oil by distillation and/or refining and optionally further purification and finishing processes, the term mineral oil including in particular the higher-boiling fractions of crude or mineral oil.

In general, the boiling point of mineral oil is higher than 200° C., preferably higher than 300° C., at 50 mbar. The production by low-temperature carbonization of shell oil, coking of bituminous coal, distillation of brown coal with exclusion of air, and also hydrogenation of bituminous or brown coal is likewise possible. Mineral oils are also produced in a smaller proportion from raw materials of vegetable (for example from jojoba, rapeseed) or animal (for example neatsfoot oil) origin. Accordingly, mineral oils have, depending on their origin, different proportions of aromatic, cyclic, branched and linear hydrocarbons.

In general, a distinction is drawn between paraffin-base, naphthenic and aromatic fractions in crude oils or mineral oils, in which the term paraffin-base fraction represents longer-chain or highly branched isoalkanes, and naphthenic fraction represents cycloalkanes. In addition, mineral oils, depending on their origin and finishing, have different fractions of n-alkanes, isoalkanes having a low degree of branching, known as mono-methyl-branched paraffins, and compounds having heteroatoms, in particular O, N and/or S, to which polar properties are attributed. The fraction of the n-alkanes in preferred mineral oils is less than 3% by weight, the proportion of the O-, N- and/or S-containing compounds less than 6% by weight. The proportion of the aromatics and of the mono-methyl-branched paraffins is generally in each case in the range from 0 to 30% by weight. In one interesting aspect, mineral oil comprises mainly naphthenic and paraffin-base alkanes which have generally more than 13, preferably more than 18 and most preferably more than 20 carbon atoms. The fraction of these compounds is generally $\geq 60\%$ by weight, preferably $\geq 80\%$ by weight, without any intention that this should impose a restriction.

An analysis of particularly preferred mineral oils which was effected by means of conventional processes such as urea separation and liquid chromatography on silica gel shows, for example, the following constituents, the percentages relating to the total weight of the particular mineral oil used:
n-alkanes having from approx. 18 to 31 carbon atoms:
0.7-1.0%,
slightly branched alkanes having from 18 to 31 carbon atoms:
1.0-8.0%,
aromatics having from 14 to 32 carbon atoms:
0.4-10.7%,
iso- and cycloalkanes having from 20 to 32 carbon atoms:
60.7-82.4%,
polar compounds:
0.1-0.8%,
loss:
6.9-19.4%.

Valuable information with regard to the analysis of mineral oils and a list of mineral oils which have a different composition can be found, for example, in Ullmanns Encyclopedia of Industrial Chemistry, 5th Edition on CD-ROM, 1997, under "lubricants and related products".

Synthetic oils include organic esters, organic ethers such as silicone oils, and synthetic hydrocarbons, in particular polyolefins. They are usually somewhat more expensive than the mineral oils, but have advantages with regard to their performance. For illustration, reference should also be made to the 5 API classes of base oil types (API: American Petroleum Institute), these base oils being usable with particular preference as the solvent.

These solvents may be used, inter alia, in an amount of from 1 to 99% by weight, preferably from 5 to 95% by weight, more preferably from 5 to 60% by weight and most preferably from 10 to 50% by weight, based on the total weight of the mixture, without any intention that this should impose a restriction.

The thus prepared block copolymers generally have a molecular weight in the range from 1000 to 1 000 000 g/mol, preferably in the range from $10*10^3$ to $500*10^3$ g/mol and more preferably in the range from $20*10^3$ to $300*10^3$ g/mol, without any intention that this should impose a restriction. These values relate to the weight-average molecular weight of the polydispersed polymers in the composition.

The particular advantage of ATRP or RAFT in comparison to conventional free-radical polymerization processes consists in the ability to prepare polymers with a narrow molecular weight distribution. Without any intention that this should impose a restriction, the inventive polymers have a polydispersity, given by $M_w/M_n$, in the range from 1 to 12, preferably from 1 to 4.5, more preferably from 1 to 3 and most preferably from 1.05 to 2.

The weight-average molecular weight $M_w$ and the number-average molecular weight $M_n$ may be determined by known methods, for example by gel permeation chromatography (GPC).

The inventive lubricant compositions comprise base oil in addition to the block copolymers.

A suitable base oil is in principle any compound which ensures a sufficient lubricant film which does not break even at elevated temperatures. The viscosities, for example, may serve to determine this property, as are laid down in the SAE specifications for motor oils, for example. The compounds suitable for this purpose include natural oils, mineral oils and synthetic oils, and also mixtures thereof.

Natural oils are animal or vegetable oils, for example neatsfoot oils or jojoba oils. Mineral oils have been described in detail above as a solvent. They are advantageous especially with regard to their favorable cost. Synthetic oils include organic esters, synthetic hydrocarbons, in particular polyolefins, which satisfy the aforementioned requirements. They are usually somewhat more expensive than the mineral oils, but have advantages with regard to their performance.

These base oils may also be used as mixtures and are in many cases commercially available.

The inventive lubricants are suitable in particular as greases and lubricant oils, which include motor oils, gearbox oils, turbine oils, hydraulic fluids, pump oils, heat transfer oils, insulation oils, cutting oils and cylinder oils.

In addition to the constituents described, the inventive lubricant compositions may have one or more additives which are well known in the technical field.

These additives include viscosity index improvers, antioxidants, antiaging compositions, corrosion inhibitors, detergents, dispersants, EP additives, defoamers, friction modifiers, pour point depressants, dyes, odorants and/or demulsifiers.

The additives bring about favorable flow performance at low and high temperatures (improvement of the viscosity index), they suspend solids (detergent-dispersant performance), neutralize acidic reaction products and form a protective film on the cylinder surface (EP additive, "extreme pressure"). Further valuable information can be found by those skilled in the art in Ullmann's Encyclopedia of Industrial Chemistry, Fifth Edition on CD-ROM, 1998 edition.

The amounts in which these additives are used are dependent upon the field of use of the lubricant. In general, the fraction of the base oil is, however, between 25 to 90% by weight, preferably from 50 to 75% by weight. The fraction of friction-modifying block copolymer in the inventive lubricants is preferably in the range from 0.01 to 50% by weight, more preferably in the range from 0.01 to 25% by weight. However, there are also cases in which the addition of a base oil can be dispensed with. When, for example, the molecular weight of the block copolymer is selected at such a low level that it is readily free-flowing even without addition of a base oil, for example in the case of oligomeric block copolymers, the fraction of friction-modifying block copolymer in the inventive lubricants may then also be from 0.01 to 100% by weight.

The invention will be illustrated in more detail below by examples and comparative examples without any intention that the invention should be restricted to these examples.

EXAMPLES 1 TO 4

The RAFT polymerization experiments were carried out in a round-bottom flask which was equipped with a saber stirrer, hotplate, nitrogen blanketing, intensive cooler and dropping funnel. 608.0 g of the LIMA mixture (LIMA: mixture of long-chain methacrylates which was obtained from the reaction of methyl methacrylate with ®LIAL 125 from Sasol; $C_{12}$ to $C_{15}$ fatty alcohol) together with 2.90 g of cumyl dithiobenzoate, 1.22 g of tBPO (tert-butyl peroctoate) and 160 g of mineral oil were initially charged in the reaction flask, and inertized by addition of dry ice and blanketing with nitrogen. Subsequently, the mixture was heated to 85° C. with stirring.

After a reaction time of approx. 5 hours, 32.0 g of the dispersing monomer were added. After 2.5 hours, 0.64 g of tBPO was added and the reaction mixture was stirred at 85° C. overnight. A clear, viscose solution of the polymer in oil is obtained. The dispersing monomers used can be taken from Table 1.

The structure of the VI improvers was analyzed by means of chromatographic analysis methods such as size exclusion chromatography (SEC), gradient high-pressure liquid chromatography (gradient HPLC) and two-dimensional liquid chromatography. The results obtained are listed in Table 1.

COMPARATIVE EXAMPLES 1 TO 4 AND 9

855.0 g of LIMA are mixed with 45.0 g of dispersing monomer and 27.0 g of dodecyl mercaptan (DDM). 11.1 g of this mixture are charged together with 100.0 g of mineral oil into the reaction flask of a 2-liter stirred apparatus with saber stirrer, stirrer motor, cooler, thermometer, feed pump and inert gas inlet. The apparatus is inertized and heated to 100° C. with the aid of an oil bath. The remaining monomer mixture is admixed with 1.78 g of tBPO (tert-butyl peroctoate). When the reaction flask has attained the desired internal temperature of 100° C., 0.33 g of tBPO is added, and the monomer feed is at the same time commenced by means of a pump. The monomer is added uniformly over a period of 210 min at the abovementioned temperature. 2 h after the end of feeding, another 1.80 g of tBPO are added and the mixture is stirred at 100° C. for a further 2 h. A clear, low-viscosity solution of the abovementioned polymer in oil is obtained.

A clear, viscose solution of the polymer in oil is obtained. The dispersing monomers used can be taken from Table 1.

The structure of the VI improvers was analyzed by means of chromatographic analysis methods such as size exclusion chromatography (SEC), gradient high-pressure liquid chromatography (Gradient HPLC) and two-dimensional liquid chromatography. The results obtained are listed in Table 1.

TABLE 1

Composition of the VI improvers

| | Dispersing monomer | Architecture |
|---|---|---|
| Example 1 | DMAPMAM | Block copolymer |
| Example 2 | HEMA | Block copolymer |
| Example 3 | Ethoxylated methacrylate | Block copolymer |
| Example 4 | DMAEMA | Block copolymer |
| Comparative Example 1 | DMAPMAM | Random copolymer |
| Comparative Example 2 | HEMA | Random copolymer |
| Comparative Example 3 | Ethoxylated methacrylate | Random copolymer |
| Comparative Example 4 | DMAEMA | Random copolymer |
| Comparative Example 9 | None | Homopolymer |

In Table 1,
DMAPMAM: N-(3-Dimethylaminopropyl)methacrylamide
HEMA: 2-Hydroxyethyl methacrylate
Ethoxylated methacrylate: Methacrylate obtainable by transesterification of methyl methacrylate with ®Marlipal® O13/120 from Sasol
DMAEMA: Dimethylaminoethyl methacrylate

EXAMPLES 5 TO 8 AND COMPARATIVE EXAMPLES 5 TO 8, 10 AND 11

The different VI improvers were dissolved in an SN 150 paraffinic base oil in such an amount that a comparable kinematic viscosity at 120° C. to ASTM D 445 was obtained. As a comparison, two base oils without VI improver were also mixed in such a way that the same kinematic viscosity was likewise obtained. The thus obtained compositions are compiled in Table 2. The characteristic viscosity data of the formulations used are compiled in Table 3:

TABLE 2

Composition and characterization of the lubricants

| | VI improver | Fraction [% by wt.] | Fraction of base oil [% by wt.] |
|---|---|---|---|
| Comparative Ex. 5 | Comparative Ex. 1 | 11.0 | 89.0 |
| Example 5 | Example 1 | 9.5 | 90.5 |
| Comparative Ex. 6 | Comparative Ex. 2 | 10.7 | 89.3 |
| Example 6 | Example 2 | 19.3 | 80.7 |
| Comparative Ex. 7 | Comparative Ex. 3 | 15.6 | 84.4 |
| Example 7 | Example 3 | 19.3 | 80.7 |
| Comparative Ex. 8 | Comparative Ex. 4 | 31.5 | 68.5 |
| Example 8 | Example 4 | 19.2 | 80.8 |
| Comparative Ex. 10 | — | 0 | 100 |
| Comparative Ex. 11 | Comparative Ex. 9 | 31.5 | 68.5 |

TABLE 3

| | Components | | | |
|---|---|---|---|---|
| | KV120/mm²/s ASTM D 445 | KV100/mm²/s ASTM D 445 | KV40/mm²/s ASTM D 445 | VI |
| Comparative Ex. 5 | 9.189 | 13.26 | 80.10 | 168 |
| Example 5 | 9.183 | 13.19 | 83.94 | 158 |
| Comparative Ex. 6 | 9.156 | 13.12 | 76.09 | 175 |

TABLE 3-continued

| | Components | | | |
|---|---|---|---|---|
| | KV120/mm²/s ASTM D 445 | KV100/mm²/s ASTM D 445 | KV40/mm²/s ASTM D 445 | VI |
| Example 6 | 9.114 | 13.15 | 79.64 | 167 |
| Comparative Ex. 7 | 9.195 | 75.60 | 12.98 | 174 |
| Example 7 | 9.205 | 92.01 | 13.54 | 148 |
| Comparative Ex. 8 | 9.172 | 100.5 | 13.91 | 140 |
| Example 8 | 9.188 | 80.85 | 13.28 | 167 |
| Comparative Ex. 10 | 9.241 | 152.5 | 14.69 | 95 |
| Comparative Ex. 11 | 9.196 | 13.62 | 92.56 | 149 |

The properties of the thus obtained lubricant oils were determined by means of frictional experiments.

The frictional experiments were carried out on a mini traction machine (PCS Instruments) under the following conditions:

TABLE 4

| Test parameters and conditions for the MTM frictional tests | |
|---|---|
| Test rig | PCS MTM 3 |
| Disk | Steel, AISI 52100, diameter = 40.0 mm RMS = 25-30 nm, Rockwell C hardness = 63 Elastic modulus = 207 GPa |
| Ball | Steel, AISI 52100, diameter = 19.0 mm RMS = 10-13 nm, Rockwell C hardness = 58-65 Elastic modulus = 207 GPa |
| Speed | 0.005 m/s-2.5 m/s |
| Temperature | 120° C. |
| Sliding/rolling ratio | 50% |
| Load | 30 N = 0.93 GPa max. Hertzian pressure |

As a result of a frictional experiment, a Stribeck curve was obtained (coefficient of friction as a function of the rolling/sliding speed), which are shown in FIGS. 1 to 4.

FIG. 1 shows the frictional performance of the paraffin-base base-oil mixture according to Comparative Example 10 as a function of the mean speed of the two surfaces moving against one another. The resulting data are shown as a solid line. In comparison, the frictional curve of the lubricant oil with the non-dispersing VI improver according to Comparative Example 11 did show a slightly reduced coefficient of friction in absolute terms, but no improvement whatsoever as far as the frictional performance down to low speeds is concerned. The resulting data are shown as filled circles (●). The curvature of the curve is virtually identical within the precision of measurement, i.e. regions of mixed and interface friction are already attained at unchanged high speed. The drop in absolute terms of the frictional profile in the case of the polymer-containing formulation can be attributed in this context to the replacement of base oil components by a fraction of VI improver (Comparative Example 9) in the lubricant composition.

FIG. 2 shows the Stribeck curves of the lubricant mixture according to Example 5, Comparative Example 5 and Comparative Example 11. The data of the lubricant mixture according to Example 5 are shown as open squares (□), and the data of the lubricant mixtures according to Comparative Example 5 and Comparative Example 11 are shown as filled squares (■) and as filled circles (●) respectively.

FIG. 2 shows that the lubricant which comprises the VI improver according to Example 1 has a distinctly reduced frictional value from a speed of 0.4 m/s. The frictional profile of the Stribeck curve is shifted to lower speeds to such an extent that, within the measuring capabilities of the mini traction machine down to 0.0056 m/s, no significant rise in the coefficient of friction can be observed. In the speed range between 0.4 and 0.04 m/s, a slight lowering in the coefficient of friction with falling speed is even achieved.

Figure 1:
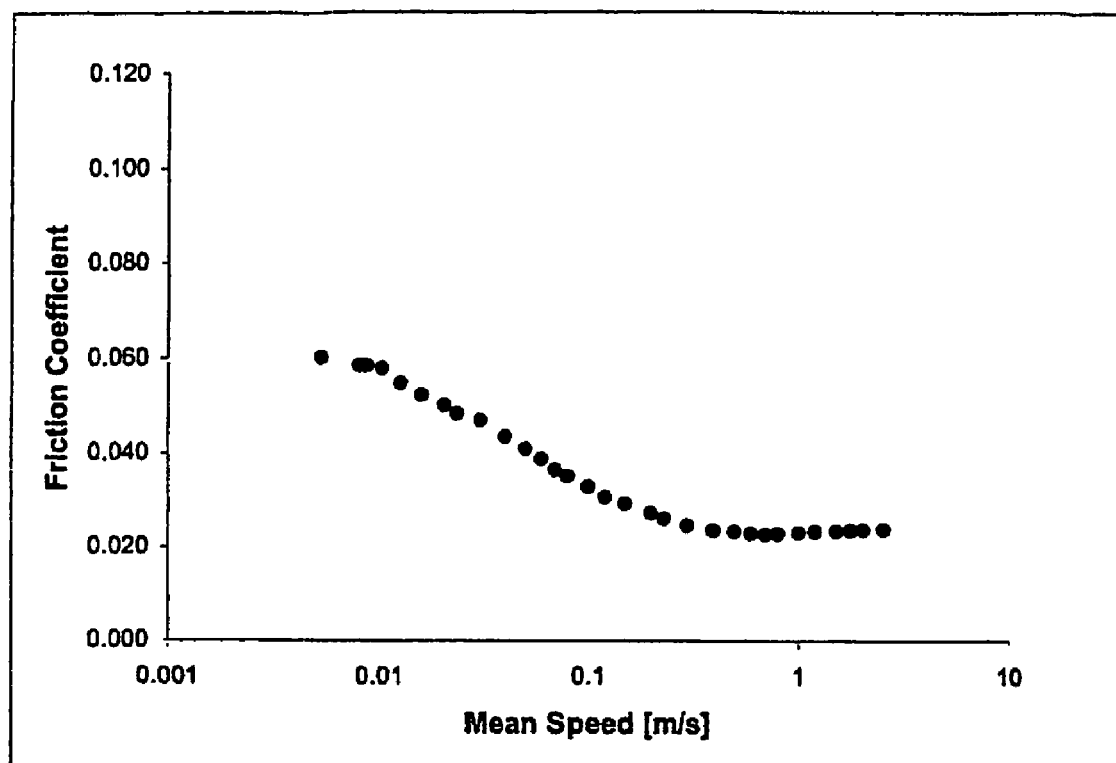
Figure 2:
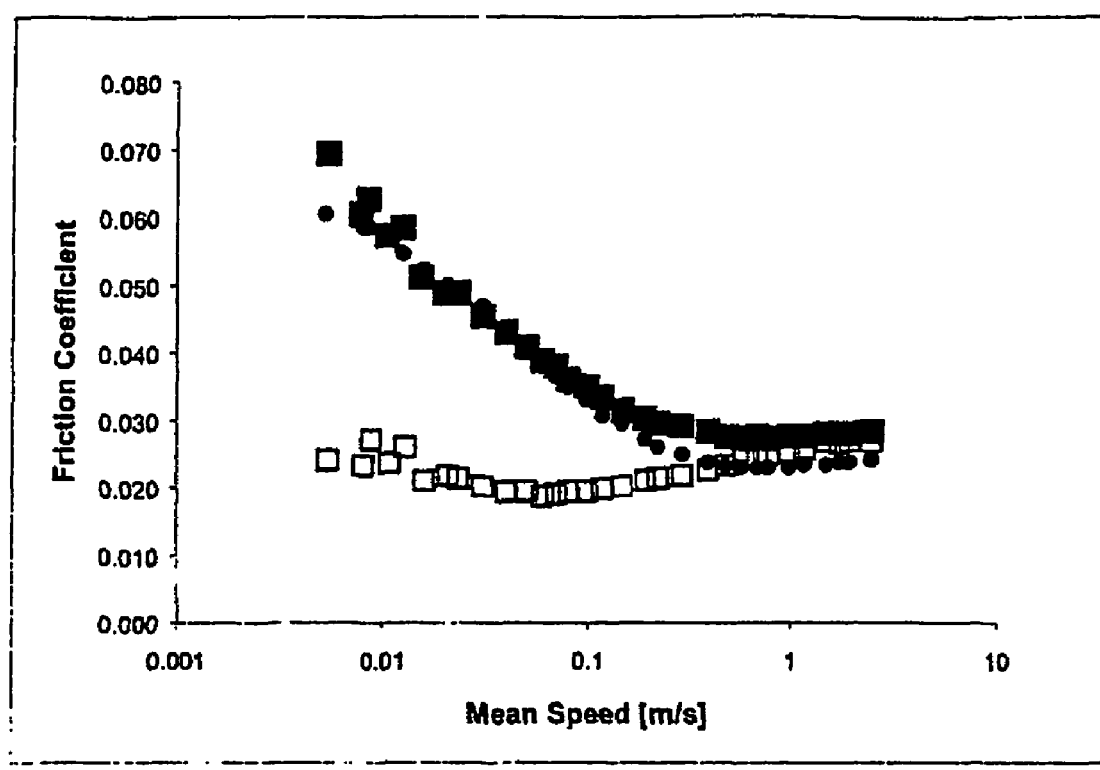
Figure 3:
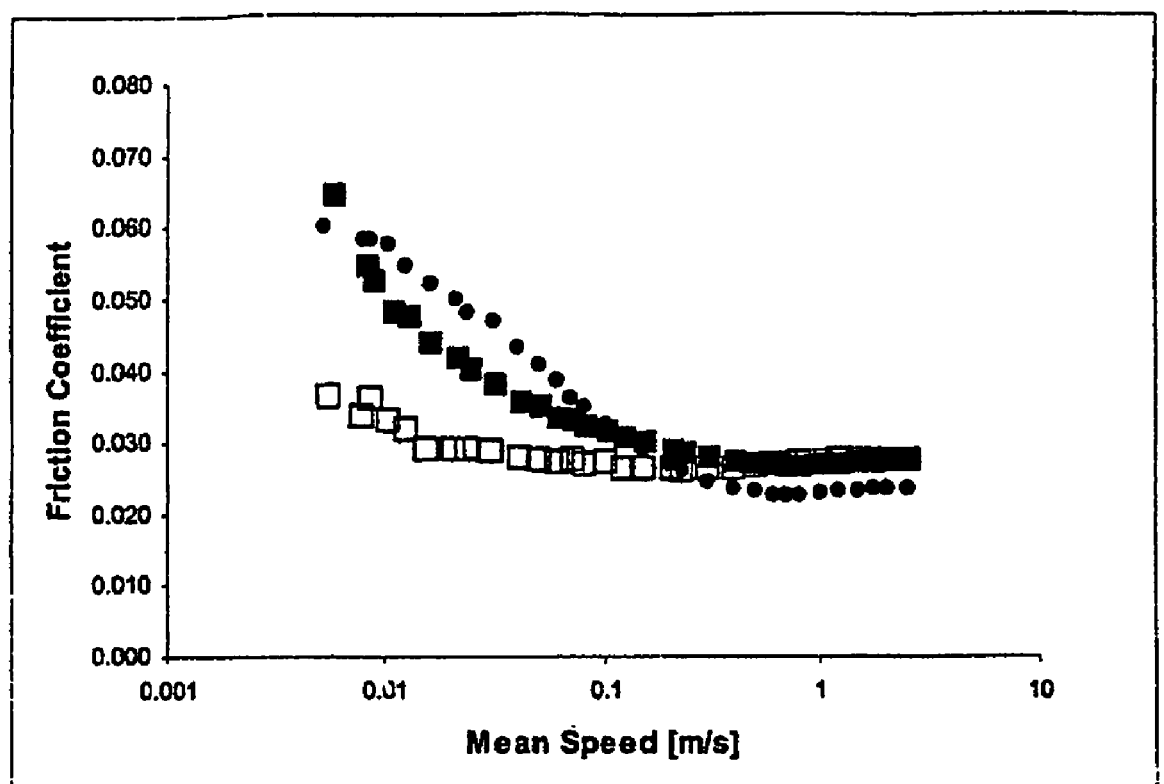
FIG. 3 shows the Stribeck curves of the lubricant mixture according to Example 6, Comparative Example 6 and Comparative Example 11. The data of the lubricant mixture according to Example 6 are shown as open squares (□), and the data of the lubricant mixtures according to Comparative Example 6 and Comparative Example 11 are shown as filled squares (■) and as filled circles (●).
Figure 4:
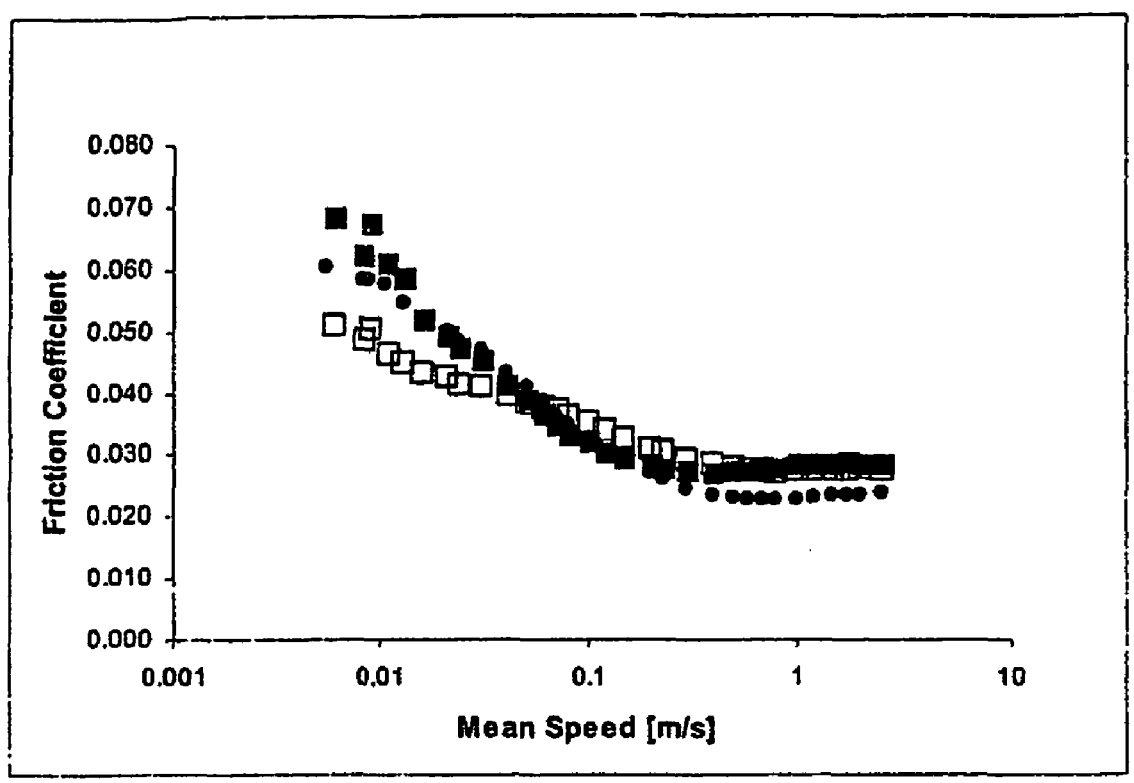
FIG. 4 shows the Stribeck curves of the lubricant mixture according to Example 7, Comparative Example 7 and Comparative Example 11. The data of the lubricant mixture according to Example 7 are shown as open squares (□), and the data of the lubricant mixtures according to Comparative Example 7 and Comparative Example 11 are shown as filled squares (■) and as filled circles (●).
Figure 5:
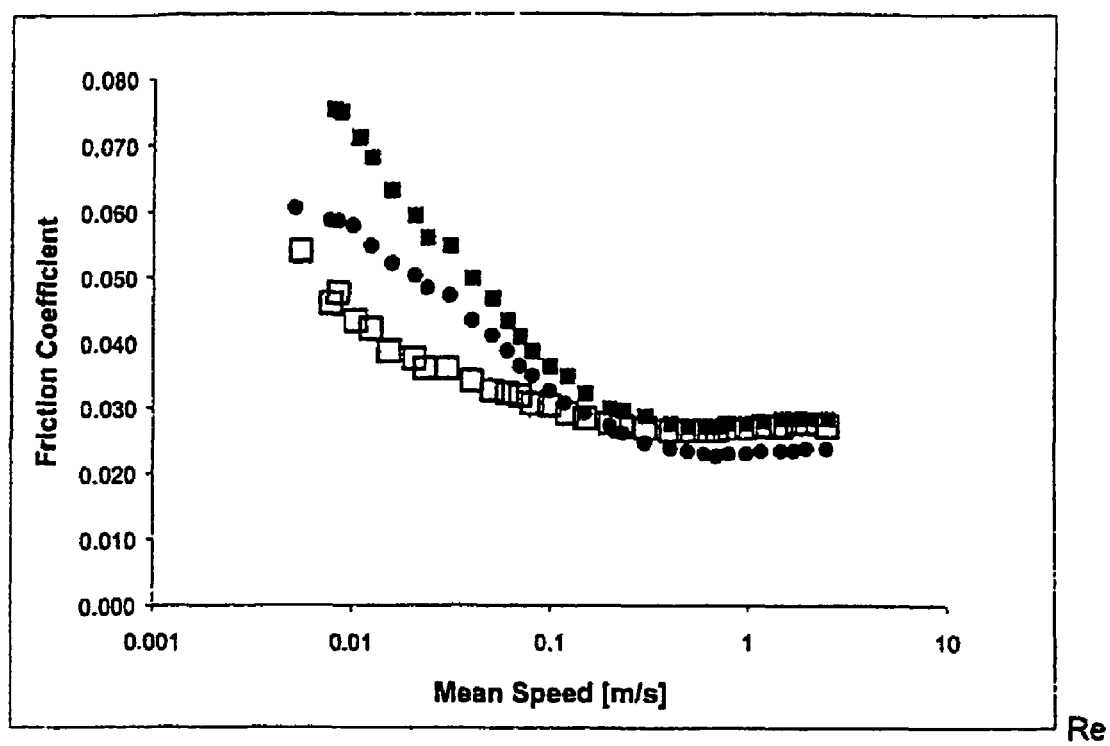
FIG. 5 shows the Stribeck curves of the lubricant mixture according to Example 8, Comparative Example 8 and Comparative Example 11. The data of the lubricant mixture according to Example 8 are shown as open squares (□), and the data of the lubricant mixtures according to Comparative Example 8 and Comparative Example 11 are shown as filled squares (■) and as filled circles (●).

What is claimed is:

1. A lubricant composition having good frictional properties, comprising:
   a base oil and
   at least one additive having friction-modifying properties, wherein
   the additive having friction-modifying properties is a block copolymer comprising:
   hydrophobic segments P and
   polar segments D,
   wherein the hydrophobic segments are obtained by polymerization of monomer compositions which comprises
   a) from 0.5 to 40% by weight, based on the weight of the monomer compositions for preparing the hydrophobic segments, of one or more ethylenically unsaturated ester compounds of the formula (I):

wherein
   R is hydrogen or methyl,
   $R^1$ is a linear or branched alkyl radical having from 1 to 5 carbon atoms,
   $R^2$ and $R^3$ are each independently hydrogen or a group of the formula —COOR' in which R' is hydrogen or an alkyl group having from 1 to 5 carbon atoms,
   b) from 50 to 99.5% by weight, based on the weight of the monomer compositions for preparing the hydrophobic segments, of one or more ethylenically unsaturated ester compounds of the formula (II):

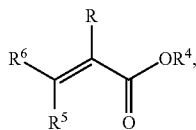

wherein
R is hydrogen or methyl,
R⁴ is a linear or branched alkyl radical having from 6 to 30 carbon atoms,
R⁵ and R⁶ are each independently hydrogen or a group of the formula —COOR" in which R" is hydrogen or an alkyl group having from 6 to 30 carbon atoms,
c) from 0 to 50% by weight, based on the weight of the monomer compositions for preparing the hydrophobic segments, of comonomers,
and the polar segments are represented by the formula (III):

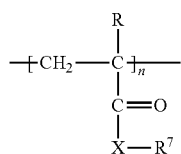

wherein
R is independently hydrogen or methyl,
R⁷ is independently a group comprising from 2 to 1000 carbon atoms and having at least one heteroatom,
X is independently a sulfur or oxygen atom or a group of the formula NR⁸ in which
R⁸ is independently hydrogen or a group having from 1 to 20 carbon atoms, and
n is an integer greater than or equal to 3, and further
wherein a ratio of the length of the hydrophobic segments to the polar segments of the block copolymer is in the range of from 5:1 to 1:2.

2. The lubricant composition as claimed in claim 1, wherein the R⁷ radical in formula (III) has at least one group of the formula —OH or —NR⁸R⁸ in which the R⁸ radicals independently represents a hydrogen or a group comprising from 1 to 20 carbon atoms.

3. The lubricant composition as claimed in claim 1, wherein the X group in formula (III) is represented by the formula NH.

4. The lubricant composition as claimed in claim 1, wherein a numerical ratio of heteroatoms to carbon atoms in the R⁷ radical of the formula (III) is in the range from 1:1 to 1:5.

5. The lubricant composition as claimed in claim 1, wherein the R⁷ radical of the formula (III) comprises at most 10 carbon atoms.

6. The lubricant composition as claimed in claim 1, wherein the polar segment D is obtained by polymerization of aminoalkyl (meth)acrylates, aminoalkyl (meth)acrylatamides and/or hydroxyalkyl (meth)acrylates.

7. The lubricant composition as claimed in claim 6, wherein the polar segment D is obtained by polymerization of a monomer selected from the group consisting of 2-hydroxyethyl methacrylate, N-(3-dimethylaminopropyl)methacrylamide and a mixture thereof.

8. The lubricant composition as claimed in claim 1, wherein the block copolymer is a block copolymer type selected from the group consisting of a diblock, a triblock, a multiblock, a comb and a star copolymer.

9. The lubricant composition as claimed in claim 8, wherein the block copolymer is a diblock, triblock or tetrablock copolymer.

10. The lubricant composition as claimed in claim 8, wherein the hydrophobic segment P has a weight-average degree of polymerization in the range from 20 to 5000.

11. The lubricant composition as claimed in claim 8, wherein the polar segment D has a weight-average degree of polymerization in the range from 10 to 1000.

12. The lubricant composition as claimed in claim 1, wherein a weight ratio of the polar segments D to the hydrophobic segments P is in the range from 1:1 to 1:100.

13. The lubricant composition as claimed in claim 1, wherein the lubricant composition further comprises at least one selected from the group consisting of a viscosity index improver, an antioxidant, a corrosion inhibitor, a detergent, a dispersant, a EP additive, a defoamer, a friction modifier and a demulsifier.

14. The lubricant composition as claimed in claim 1, wherein the block copolymer comprising the segments P and D is present in an amount of from 0.01 to 100% by weight.

15. A process for producing lubricant composition as claimed in claim 1, comprising:
polymerizing monomer compositions in a lubricant oil in the presence of initiators which have a transferable atom group and one or more catalysts which comprise at least one transition metal, in the presence of ligands which can form a coordination compound with the metallic catalyst(s),
separately forming hydrophobic and polar segments by variation of the monomer composition during the polymerization.

16. A process for preparing lubricant composition as claimed in claim 1, comprising:
polymerizing monomer compositions in a lubricant oil in the presence of dithiocarboxylic ester,
separately forming hydrophobic and polar segments by variation of the monomer composition during the polymerization.

17. A gear oil, motor oil, hydraulic oil or grease comprising a lubricant composition as claimed in claim 1.

* * * * *